United States Patent [19]

Miller

[11] Patent Number: 5,104,429

[45] Date of Patent: Apr. 14, 1992

[54] SELF-CLEANING GAS FILTRATION APPARATUS AND METHODS

[75] Inventor: Laurence O. Miller, Vernon, Tex.

[73] Assignee: Kinlau Sheet Metal Works, Inc., Vernon, Tex.

[21] Appl. No.: 556,562

[22] Filed: Jul. 20, 1990

[51] Int. Cl.⁵ .................. B01D 46/02; B01D 29/17
[52] U.S. Cl. .......................... 55/293; 55/304; 55/337; 55/366; 55/378; 55/429; 55/459.1
[58] Field of Search .................. 55/96, 293, 301, 304, 55/357, 341.2, 366, 374, 378, 428, 429, 459.1

[56] References Cited

U.S. PATENT DOCUMENTS

| | | | |
|---|---|---|---|
| 971,390 | 9/1910 | Matchette | 55/366 |
| 2,001,184 | 5/1935 | Cuppy | 55/341.2 X |
| 3,080,694 | 3/1963 | Smith | 55/293 X |
| 3,095,289 | 6/1963 | Egan | 55/96 X |
| 3,097,937 | 7/1963 | Lincoln | 55/341.2 X |
| 3,146,080 | 8/1964 | Ruble et al. | 55/96 |
| 3,177,636 | 4/1965 | Jensen | 55/341.2 X |
| 3,212,237 | 10/1965 | Wright | 55/96 |
| 3,308,609 | 3/1967 | McCulloch et al. | 55/337 X |
| 3,320,727 | 5/1967 | Farley et al. | 55/337 |
| 3,491,518 | 1/1970 | Williams | 55/341.2 X |
| 3,520,109 | 7/1970 | Caskey | 55/96 |
| 3,685,257 | 8/1972 | Burke | 55/96 |
| 3,736,728 | 6/1973 | Kleissler, Jr. | 55/341.2 X |
| 3,951,630 | 4/1976 | Kleissler, Jr. | 55/378 |
| 4,584,003 | 4/1986 | Oda et al. | 55/337 X |
| 4,636,301 | 1/1987 | Laramore | 55/284 X |
| 4,648,889 | 3/1987 | Jensen | 55/378 X |
| 4,655,806 | 4/1987 | Bowersox | 55/341.2 |

Primary Examiner—Robert Spitzer
Attorney, Agent, or Firm—Hubbard, Thurman, Tucker & Harris

[57] ABSTRACT

A self-cleaning filtration system for removing particulate matter from a particulate laden gas flow includes a housing having an upper end opening for receiving the gas flow, a lower end opening communicating with the interior of a large particulate receiving container positioned beneath the housing, a vertical internal passage extending between the upper and lower end openings, and a vertically spaced plurality of side wall openings communicating with the internal passage. Coaxially supported within the internal passage is an open-ended, flexible tubular filter element through which the received gas flow downwardly passes. During filtration system operation, a major portion of the downwardly flowing gas is forced laterally through the filter element, and is flowed outwardly through the housing side wall openings as cleansed gas, while a minor, unfiltered portion of the gas flow is downwardly discharged into the container. The downward gas throughflow tends to dislodge adhered particulate matter from the inner side surface of the filter element, the dislodged particulate matter falling into the container.

8 Claims, 2 Drawing Sheets

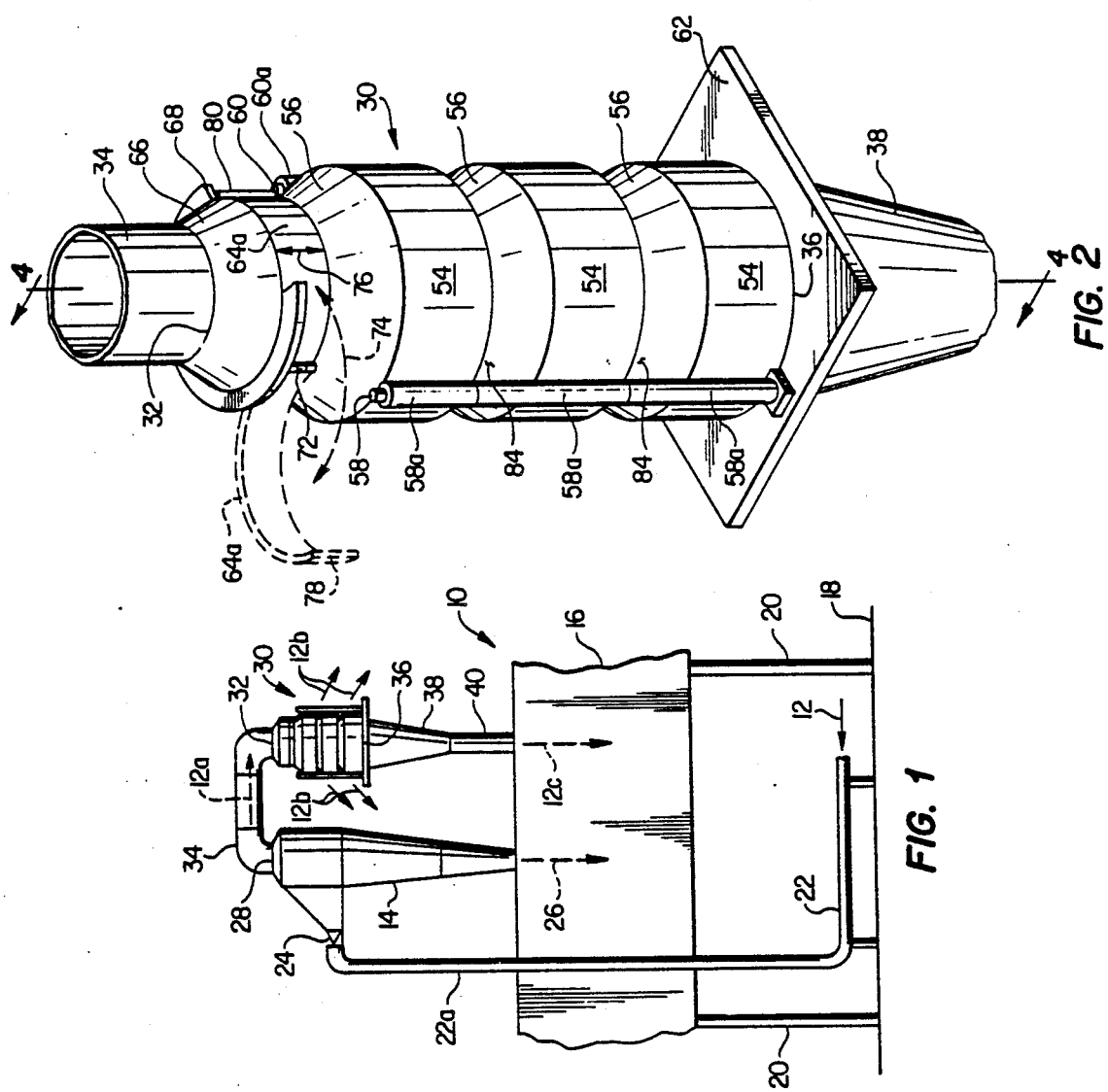

SELF-CLEANING GAS FILTRATION APPARATUS AND METHODS

BACKGROUND OF THE INVENTION

The present invention relates generally to filtration apparatus, and more particularly relates to filtration apparatus for removing particulate material from a particulate laden gas flow.

The removal of particulate matter from a particulate laden gas is conventionally carried out by flowing the gas through a suitable filtration material which traps the particulate matter while permitting cleansed gas to flow therethrough. The resulting particulate matter buildup on the filtration material has, in many instances, heretofore required either frequent filter replacement or the provision of often complex and relatively expensive filter cleaning systems which are periodically operative to mechanically or pneumatically dislodge the adhered particulate matter from the filtration material to permit continued use of the filter element without changeout thereof.

It can readily be seen that it would be desirable to provide self-cleaning gas filtration apparatus which avoids the previous necessity of either frequently replacing the filter element or providing the apparatus with a separate filter cleaning system. It is accordingly an object of the present invention to provide such self-cleaning gas filtration apparatus and associated methods.

SUMMARY OF THE INVENTION

Various aspects of the present invention, by themselves and in combinations with one another, may be utilized to provide improved, self-cleaning filtration apparatus and associated methods for removing particulate matter from a particulate laden gas flow. Set forth below are brief summaries of various features of the present invention. The sole purpose of the following summarization is to provide a general overview of the present invention, and is not to be construed as in any manner limiting its nature or scope.

According to one aspect of the present invention, a hollow, open-ended tubular filter element is formed from a flexible filtration material and is coaxially supported within the vertical internal passage of a housing structure having an upper end opening adapted to receive a particulate laden gas flow and communicating with the open upper end of the filter element; a lower end opening positioned at the bottom of the internal passage and connectable to a top side opening in a large particulate receiving container positioned beneath the housing; and at least one side wall opening positioned between the upper and lower housing end openings and communicating with the internal housing passage.

When the lower housing end opening is operatively communicated with the interior of the container and the particulate laden gas is flowed downwardly through the interior of the vertical filter element, a major portion of the gas flow is forced laterally outwardly through the filter element side wall and exits each housing side wall opening as cleansed gas, while a minor, unfiltered portion of the downward gas flow is discharged into the container.

The continuous downward throughflow of gas through the interior of the vertical filter element acts to dislodge particulate matter adhered to its inner side surface, thereby tending to render the filter element self-cleaning, the dislodged particulate matter falling into the container for subsequent removal therefrom. This continuous filter throughflow advantageously avoids the necessity for frequent filter replacement, and also eliminates the need for providing the filtration system with a separate filter cleaning system.

According to another feature of the present invention, the lower end opening of the filter housing is operatively connected to the particulate receiving container by a vertically disposed, conically shaped duct with a downwardly and inwardly shaped side wall section. The tubular filter element is formed from a filtration cloth material, extends downwardly into the conical duct, and has a weighted lower end portion which bears against and forms an annular gas seal with an annular interior side surface portion of the conical duct.

According to a further aspect of the present invention, the filter housing is formed from a plurality of hollow open-ended sections which are supported on vertical rods extending through sleeve members secured to the sections and cooperating to support the housing sections in a vertically stacked and spaced apart orientation. Filter installation and removal access is preferably provided by a swing-out arcuate section of the uppermost housing section, and the flexible filter element is provided at its upper end with an annular flange removably positionable within an arcuate interior groove disposed within the uppermost housing section.

The filtration apparatus of the present invention is representatively incorporated in the overall particulate filtration portion of an automated cotton ginning system, the filtration system including a cyclone filter structure connected to the top side of a large particulate receiving container and having an inlet opening for receiving the particulate laden waste air from the ginning apparatus, a particulate drop conduit connected to the container, and an air exhaust opening. To further filter the exhaust air discharged from the cyclone filter, the exhaust air is flowed downwardly through the filtration apparatus of the present invention which is vertically mounted atop the particulate receiving container adjacent the cyclone filter structure.

BRIEF DESCRIPTION OF THE DRAWINGS

FIG. 1 is a simplified fragmentary side elevational view of the waste filtration portion of an automated cotton ginning system, the waste filtration portion having incorporated therein an exhaust filter structure embodying principles of the present invention;

FIG. 2 is an enlarged scale perspective view of the filter structure;

FIG. 3 is a perspective view of an elongated tubular filter member removed from the filter structure of FIG. 2.

DETAILED DESCRIPTION

Figure 4:
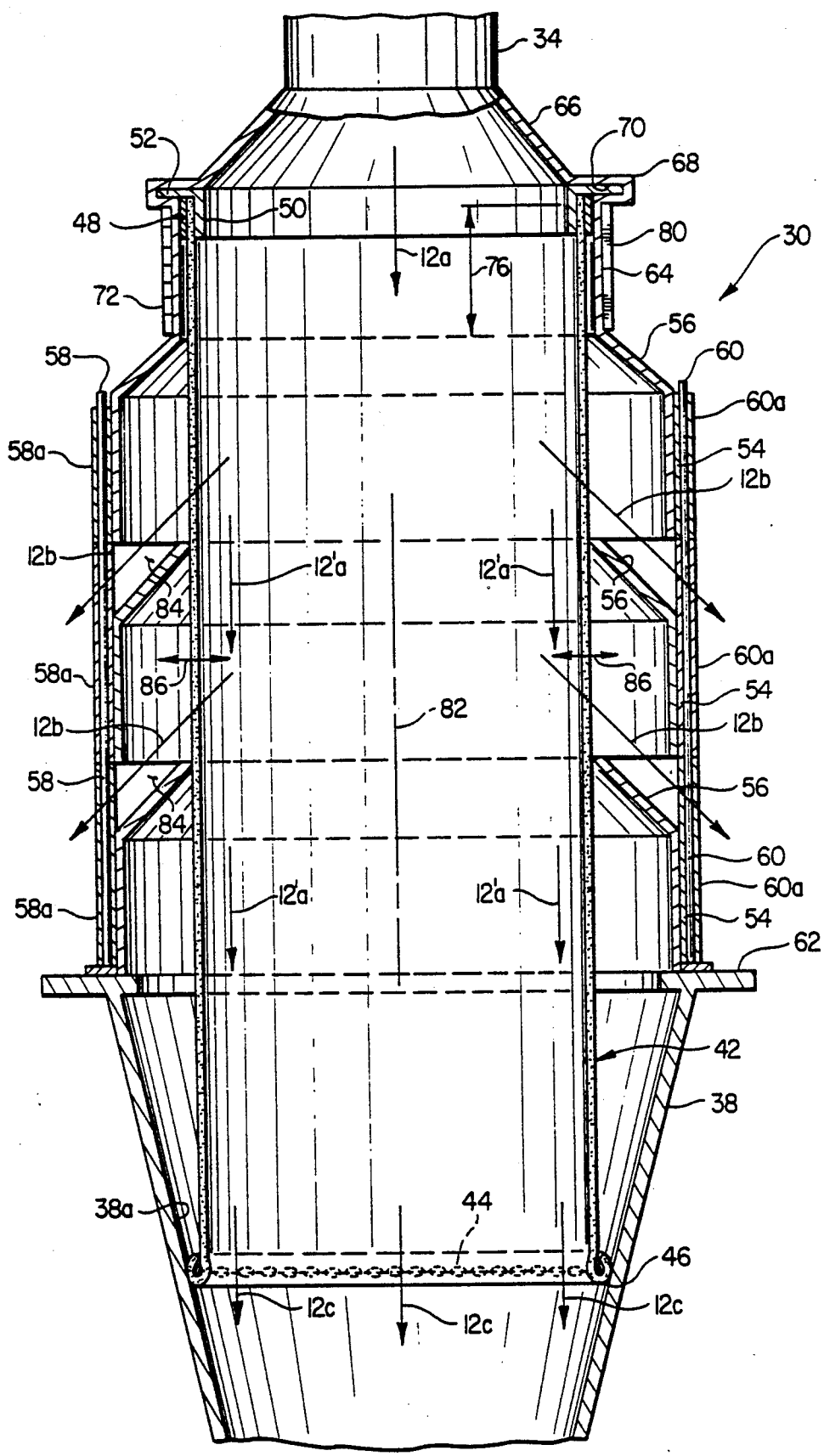
FIG. 4 is an enlarged scale cross-sectional view taken through the filter structure along line 4—4 of FIG. 2.

Illustrated in FIG. 1 is the waste filtration portion 10 of an automated cotton ginning system which continuously discharges a stream of particulate laden waste discharge air 12. Waste filtration portion 10 includes a conventional cyclone filter structure 14 mounted atop a large solid waste receiving container 16 which is elevated above the ground 18 by suitable vertical support legs 20. The waste discharge air 12 is flowed through a ground-supported pipe 22 having a vertical discharge end portion 22$_a$ connected to the inlet 24 of the cyclone filter structure 14. In a conventional manner, the cyclone filter structure 14 operates to whirl the incoming, particulate laden air 12 about a generally vertical axis to separate from the whirling air the heavier particulate waste material 26, which falls into the receiving container 16 as illustrated, and then discharge partially cleansed air 12$_a$ (containing lighter remaining particulate matter) out of the top end 28 of the cyclone filter structure 14. The particulate waste material 26 is periodically emptied from container 16 into haulage vehicles driven under the container.

Under previous conventional practice, the partially cleansed air 12$_a$ exiting the cyclone filter was simply discharged to atmosphere. However, with ever tightening environmental protection regulations, such ambient discharge is no longer desirable, and in many instances is prohibited. To address this environmental protection problem, the present invention provides a uniquely constructed and operative exhaust filter structure 30 which has an upper inlet end 32 connected to the top end 28 of the cyclone filter 14 by a generally inverted U-shaped transfer pipe 34, and a bottom outlet end 36 secured to the top end of a discharge cone 38 that communicates with the interior of the waste receiving container 16 via an outlet pipe 40.

As will be seen, the exhaust filter 30 is of a simple and inexpensive construction, is at least partially self-cleaning, and has a desirably low internal pressure drop so as not to materially impede the operation of the cyclone filter 14. As will also be seen, of the total volume of particulate laden air 12$_a$ received by the exhaust filter structure 30, a substantially cleansed major portion 12$_b$ is discharged to ambient, while a minor remaining portion 12$_c$ is flowed into the large waste receiving container 16 in a manner facilitating the internal self-cleaning action of the exhaust filter structure 30.

Referring now to FIGS. 2-4, the exhaust filter 30 includes a vertically oriented cylindrical cloth filter element 42 which is suitably weighted at its open lower end by, for example, a circular chain section 44 captively retained within an annular cavity formed by an externally upturned lower end portion 46 of the filter element which is sewn or otherwise suitably secured to the balance of the cloth filter element. The open upper end of the filter element 42 is outwardly secured, by means of a band clamp assembly 48, to an annular connection member 50 having, around the periphery of its upper end, a radially outwardly projecting annular flange 52.

The exhaust filter 30 also includes a housing structure comprising a plurality (three as representatively illustrated) of hollow cylindrical, open-ended housing sections 54, each of the sections 54 having an upwardly and radially inwardly sloped top end portion 56. The housing sections 54 are held in their illustrated vertically stacked and separated orientation by means of two vertical rods 58, 60 which pass upwardly through cylindrical sleeves 58$_a$, 60$_a$ externally mounted on diametrically opposite sides of each of the housing sections 54. The lower ends of the rods 58, 60 are suitably anchored to a flange 62 at the upper end of the discharge cone 38, and the sleeve pairs 58$_a$, 60$_a$ are vertically stacked upon one another as illustrated in FIGS. 2 and 4, to hold the housing sections 54 in their vertically spaced apart orientation.

Extending upwardly from the inwardly sloped top end 56 of the uppermost housing section 54 is a cylindrical section 64 having an upwardly and radially inwardly sloped top end portion 66 operatively connected to the discharge end of the transfer pipe 34. Projecting outwardly from the juncture between the sections 64 and 66 is an arcuate section 68 which internally defines an arcuate portion of an annular groove 70.

As best illustrated in FIG. 2, an arcuate portion 64$_a$ of the cylindrical housing section 64 is pivotally connected at one end to a hinge 72 in a manner permitting the arcuate section 64$_a$ to be pivoted inwardly and outwardly relative to the balance of the housing structure, as indicated by the arrow 74 in FIG. 2, to selectively open and close an arcuate access opening portion 76 of the housing structure for purposes later described. With the arcuate housing section 64$_a$ in its inwardly pivoted closed position, its outer end 78 may be releasably secured to a suitable latch structure 80 positioned diametrically opposite the hinge 72.

As best illustrated in FIG. 4, the hollow cylindrical, open-ended filter element 42 is coaxially disposed within the interior of the filter housing structure and is centered about the axis 82 of the housing section 54. The annular flange 52 is received in the arcuate groove 70, to thereby support the filter element 42, and the annular, weighted lower end 46 of the filter element contacts and generally forms an annular air seal around the interior side surface 38$_a$ of the discharge cone 38.

The filter element 42 may be easily and quickly installed within the vertical housing structure simply by unlatching and outwardly pivoting the housing section 64$_a$ to its dotted line position shown in FIG. 2, inserting the flange 52 in the arcuate groove portion 70, moving the filter element 42 (in an axially compressed orientation) inwardly through the now open access opening 76, dropping the flexible, bottom weighted filter body downwardly through the housing sections 54, and then closing and relatching the housing section 64$_a$. Replacement of the filter element 42 may also be easily and quickly effected simply by opening the housing section 64$_a$, lifting the filter element upwardly through the housing sections 54, pulling the lifted filter element horizontally outwardly through the uncovered access opening 76, and then installing a replacement filter as described above.

Referring now to FIG. 4, during operation of the waste filtration system 10 (FIG. 1), the particulate laden exhaust air 12$_a$ discharged from the cyclone filter structure 14 downwardly enters the open upper end of the flexible filter element 42 coaxially and internally disposed within the outer housing structure of the exhaust filter 30. During the downward flow of the particulate laden exhaust air 12$_a$ through the interior of the vertical filter element 42, the relatively small filter element back presure created by the large container 16 causes a major portion 12$_b$ of the air flow 12$_a$ to be forced laterally outwardly across the filter element 42 and be discharged to ambient through the annular gaps 84 between the housing sections 54. Outward passage of the air flow 12$_b$ through the filter element 42 substantially cleanses this discharged air flow of particulate matter, which is trapped on the inner side surface of the filter element 42, to desirably reduce the overall particulate matter discharged to atmosphere. As previously mentioned, only a relatively minor unfiltered portion 12$_c$ of the entering flow 12$_a$ (representatively, approximately 10%) is delivered to the waste receiving container 16 via the open lower end of the filter element.

During operation of the exhaust filter 30, the vertically oriented flexible cylindrical filter element 42 is at least partially self-cleaning to an extent such that the filter element 42 may be used for long periods of time without the necessity for filter changeout. This desirable self-cleaning attribute of the filter element 42, to a great extent, arises from the downward flow of portions $12_a'$ of the air flow $12_a$ which continuously sweep along the inner side surface of the filter element 42 to dislodge particulate matter building up on the inner side surface of the filter element, thereby permitting the dislodged particulate matter to simply fall downwardly into the waste receiving container 16. The self-cleaning characteristic of the vertically disposed, open-ended flexible filter element 42 is further enhanced by its flexibility which permits the filter element to horizontally "flutter", as indicated by the arrows 86, in response to wind directed laterally against the exterior of the filter structure and/or variations in internal flow through the filter element. Such horizontal fluttering of the filter element tends to laterally deform various segments thereof to further facilitate dislodgement of adhered particulate matter therefrom.

This continual flow-caused dislodgement of particulate matter from the filter element greatly extends its useful operating life and eliminates the necessity for filter cleaning systems associated with the overall filter structure. The unique straight-through flow pattern of the open-ended filter element, coupled with its interior mounting within the outer filter housing structure, permits the filter element to operate quite efficiently without creating a large internal pressure drop which might adversely affect the operation and efficiency of the cyclone filter 14. The filter structure 30 may be quickly and relatively inexpensively fabricated using simple and readily available sheet metal and filter material components.

The foregoing detailed description is to be clearly understood as being given by way of illustration and example only, the spirit and scope of the present invention being limited solely by the appended claims.

What is claimed is:

1. Apparatus for removing particulate matter from a particulate laden flow of gas, comprising:
    a particulate waste receiving container;
    cyclonic filtration means positioned above said container and having an inlet for receiving the particulate laden flow of gas, means for cyclonically separating a portion of the particulate matter from the received gas flow and dropping the separated particulate matter into said container, and an outlet for discharging an exhaust flow of the partially cleansed gas; and
    exhaust filtration means for removing particulate matter from said exhaust flow, including:
       a housing disposed above said container and having an internal passage extending along a vertical axis and opening outwardly through upper and lower ends of said housing, said housing further having at least one side wall opening positioned between its upper and lower ends and communicating with said internal passage,
       first conduit means for delivering said exhaust flow to the open upper end of said housing,
       second conduit means, extending downwardly from the lower end of said housing, for communicating said internal passage with the interior of said container, and
       hollow flexible filter means, circumscribing said vertical axis and disposed within said internal passage, for interiorly receiving the exhaust flow entering the upper end of said housing, said filter means having open upper and lower ends and a side wall portion extending vertically therebetween,
    said exhaust filtration means being operative to cause a major portion of the exhaust flow downwardly traversing the interior of said filter means to flow outwardly through said side wall portion thereof and be discharged as cleansed gas through said at least one side wall opening, while permitting a minor, unfiltered portion of the exhaust flow to be downwardly discharged into said container, via the open lower end of said filter means, after downwardly flowing along the interior side surface of said filter means and dislodging therefrom particulate matter which subsequently falls into said container.

2. The apparatus of claim 1 wherein:
    said housing has a plurality of side wall openings mutually spaced apart along said vertical axis, each of said plurality of side wall openings outwardly circumscribing and communicating with said internal passage.

3. The apparatus of claim 1 wherein:
    said second conduit means have a downwardly and horizontally inwardly sloped axial section with an annular interior side surface portion circumscribing said vertical axis, and
    said filter means include a tubular filter member formed from a relatively limp filtration material and extending downwardly into said axial section of said second conduit means, said filter member having a weighted annular lower end portion which engages and generally forms a gas seal with said annular interior side surface portion of said axial section of said second conduit means.

4. Apparatus for removing particulate matter from a particulate laden flow of gas, comprising:
    a hollow housing having an upper end with an inlet opening therein through which the particulate laden flow of gas may enter the housing, an open lower end, an internal passage extending between said inlet opening and said open lower end along a vertical axis, and at least one side wall opening positioned between said inlet opening and said open lower end and communicating with said internal passage;
    a hollow outlet member having an open inlet end secured to said open lower end of said housing, an open outlet end positioned beneath said open inlet end, and a side wall portion extending between said open inlet and outlet ends, said side wall portion having an interior peripheral portion circumscribing said vertical axis and spaced downwardly apart from said open inlet end of said outlet member; and
    an elongated, open-ended tubular filter member formed from a flexible filtration material and coaxially suspended within said internal passage and said outlet member for interiorly receiving a vertical throughflow of particulate laden gas entering said housing inlet opening, said tubular filter member having a weighted lower end portion bearing against said interior peripheral portion of said outlet member and generally forming a gas seal therewith.

5. Gas filtration apparatus comprising:
a hollow filter housing structure circumscribing a first axis and being positionable to vertically orient said first axis, said filter housing structure having:
   a top end opening,
   a bottom end opening spaced apart from said top end opening along said first axis,
   an internal passage extending along said first axis from said top end opening to said bottom end opening,
   at least one side wall opening positioned between said top and bottom end openings and communicating with said internal passage,
   an arcuate interior groove section formed in an upper and portion of said housing structure and centered about said first axis, and
   an arcuate side wall portion pivotable about a second axis parallel to said first axis between a first position, in which a lateral access opening to said internal passage is formed in said upper end portion of said housing structure adjacent said arcuate interior groove section, and a second position in which said arcuate side wall portion covers said access opening;
an elongated tubular filter element formed from a flexible, relatively limp filtration material and having an open upper end, and an open, weighted lower end, said tubular filter element being coaxially disposed within said internal passage and extending along said first axis from adjacent said top end opening past said at least one side wall opening; and
an annual attachment member having an outwardly projecting annular peripheral flange, said open upper end of said tubular filter member being coaxially secured to said attachment member laterally inwardly of said flange and being positioned laterally inwardly of said access opening, said flange having an arcuate peripheral portion received by and removably retained in said interior groove section,
said tubular filter element being removable from said housing structure by moving said arcuate side wall portion from its second position to its first position, removing said arcuate peripheral flange portion from said interior groove section, and then pulling said tubular filter element out of said filter housing structure through said access opening.

6. Self-cleaning filter apparatus for removing particulate matter from a particulate laden flow of gas, comprising:
housing means having:
   an open inlet end for receiving the particulate laden flow of gas,
   an open outlet end spaced apart from said inlet end along a first axis and being operatively connectable to a particular receiving container in a manner generally vertically orienting said first axis and communicating said open outlet end with the interior of the container,
   side wall opening means positioned between said inlet and outlet ends, said side wall opening means comprising a plurality of generally annular side wall openings mutually spaced apart along said first axis, and
   an internal passage extending along said first axis and outwardly circumscribed by said plurality of generally annular side wall openings, said internal passage opening outwardly through said inlet end, said outlet end and said side wall opening means;
hollow flexible filter means circumscribing a second axis, said filter means having open first and second ends spaced apart along said second axis, in a side wall portion extending between said first and second ends; and attachment means for coaxially and removably securing said filter means within said internal housing means passage to receive and filter the flow of particulate laden gas as it passes from said open inlet end of said housing means to said open outlet end of said housing means;
said housing means and said filter means, when said outlet end of said housing means is operatively connected to the particulate receiving container, cooperating to cause a major portion of the particulate laden flow of gas to flow laterally outward through said side wall portion of said filter means and to be discharged as cleansed gas through said plurality of generally annular side wall openings, while permitting a minor unfiltered portion of the gas flow to be downwardly discharged into the receiving container through the open lower end of said filter means after downwardly flowing along interior side surface of said filter means and dislodging therefrom particulate matter which subsequently falls into the reeving container; and
said filter means including an elongated tubular filter element formed from a relatively limp material, said elongated tubular filter element being longitudinally sized to project downwardly beyond said open outlet end of said housing means when said housing means are operatively connected to the particulate receiving container of said elongated tubular filter element that is turned upwardly to form an annular pocket and is weighted by an elongated weight member extending around the interior of said pocket.

7. The self-cleaning filter apparatus of claim 6 wherein:
said elongated weight member is a length of chain.

8. Gas filtration apparatus comprising:
a horizontally disposed base member having an opening extending downwardly therethrough;
first and second elongated support members secured at lower ends thereof to said base member, outwardly of said opening, and longitudinally extending upwardly therefrom in a parallel, laterally spaced apart relationship;
a plurality of housing sections each having a pair of sleeve members thereon which internally receive said support members and cooperate to support the housing sections in a vertically stacked relationship in which the housing sections combinatively form a housing structure having open upper and lower ends, an internal passage extending between said open upper and lower ends along a vertical axis, and a vertically spaced apart plurality of wall openings circumscribing said vertical axis and communicating with said internal passage; each of said plurality of housing sections having a generally circular cross-section circumscribing said vertical axis and having an upwardly and radially inwardly sloped section projecting upwardly from an annular body portion; and
a tubular, open-ended filter element coaxially supported within said internal passage.

* * * * *